United States Patent

Scollick et al.

[15] 3,689,502

[45] Sept. 5, 1972

[54] PREPARATION OF N-(2-ALKYLTHIOETHYL) NITROIMIDAZOLES

[72] Inventors: Neil Montgomery Scollick, New London, Conn. Eric Frederick James Thorpe, Birchington, England

[73] Assignee: Pfizer Inc., New York, N.Y.

[22] Filed: Dec. 14, 1970

[21] Appl. No.: 98,212

[30] Foreign Application Priority Data

Dec. 17, 1969 Great Britain..........61,415/69

[52] U.S. Cl....................................260/309
[51] Int. Cl.........................................C07d 63/12

[58] Field of Search..............................260/309, 251

[56] References Cited

UNITED STATES PATENTS 3,349,096  10/1967  Rooney....................260/309

*Primary Examiner*—John D. Randolph
*Assistant Examiner*—Harry I. Moatz
*Attorney*—Connolly and Hutz

[57] ABSTRACT

Alkylation of 2-alkyl-5-nitroimidazole with 2-alkylthioethanols in the presence of a hydrogen halide and Lewis acid in a reaction-inert solvent at 70°–120° C.

6 Claims, No Drawings

PREPARATION OF N-(2-ALKYLTHIOETHYL) NITROIMIDAZOLES

BACKGROUND OF THE INVENTION

Continuing efforts to discover new, highly potent and nontoxic antiprotozoal agents have led to the discovery by Miller, et al., Antimicrob. Agents Chemther., 1969, p. 257, of a series of 1-alkylsulfonylethyl-2-methyl-5-nitroimidazoles, prepared by oxidation of the corresponding sulfides. This invention relates to a novel synthetic procedure, and more particularly, to a process for the production of 1-(2-alkylthioethyl)-2-methyl-5-nitroimidazoles, useful as intermediates in the preparation of the aforesaid antiprotozoal agents.

A number of methods in the art are useful for the alkylation of imidazoles, one of which is the treatment of a basic solution of the imiazole with a compound that contains a functional group that is capable of undergoing a nucleophilic displacement (Eq. 1). This group, X,

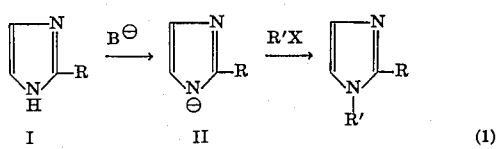

generally being tosylate

or one of the halogens. With this method no problems arise with 2-substituted imidazoles (I) for the anion formed (II) on treatment with base, and its tautomer are indistinguishable. Hence both give the same product after nucleophilic

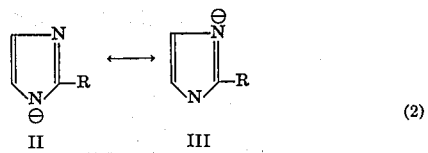

displacement on R'X (Eq. 1). However, if the imidazole ring is also substituted in the 4 or 5 position (IV) then treatment with a base leads to two tautomers (V, VI), which are distinguishable from each other.

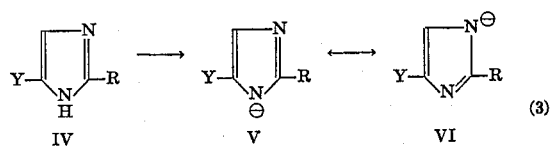

Thus N-substitution via nucleophilic attack by the imidazole anion leads to a mixture of products (Eq. 4, 5). The ratio of the isomers VII and VIII,

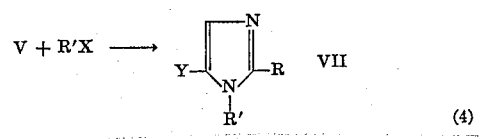

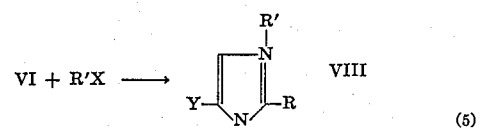

of course, depends on which tautomer V or VI is more strongly nucleophilic, which in turn depends on the electronegativity of the Y substituent in the 4- or 5- position. In the case at hand, Y is the strongly electronegative nitro group, which reduces the nucleophilicity of imidazole in general. The proximity of this group to the negative charge in tautomer removes the charge to such a degree by induction that essentially all nucleophilic attach occurs through tautomer VI (Eq. 5). As a result, the products isolated are 1,2-disubstituted-4-nitroimidazoles, Ridd, et al., J. Chem. Soc., 1960, 1352, 1357, 1363. It has been reported, British Pat. No. 837,838; C. A., 54, 24804 (1960), that on treatment with dialkyl sulfates (IX) 5-nitroimidazoles will yield 1-alkyl-5-nitroimidazoles (X). Sulfates with chains up to $C_5$ (n-pentyl) have been exemplified.

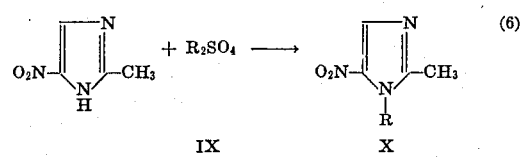

Ridd and Grimison, Chem, & Ind., (1956) 983, have reported that alkylation of 5(4)-nitroimidazole with dimethyl sulfate preferentially gives the 1-methyl-5-nitro isomer if the alkylation is carried out in aqueous formic acid.

Rooney, U. S. Pat. No. 3,349,096, has disclosed a process for the preparation of 1-hydroxyethyl-2-aryl-5-nitroimidazoles by alkylation of the substituted nitroimidazole with an epoxide in the presence of a Lewis acid.

Alkylation of 2-methyl-5-nitroimidazole with β-bromoethyl ethyl sulfide in the presence of acetic acid is reported by Miller, et al., J. Med. Chem., 13, 849 (1970) to give a 33 percent yield of the corresponding ethyl[2(bt-methyl-5-nitro-1-imidazolyl)ethyl]sulfide.

The process of the present invention precludes the necessity for the preparation of an alkylating species, such as the halides or sulfonate esters of the alkylthioethanols; thereby reducing the cost of preparation of the final product. Further, attempts to prepare said sulfonates have been without success. Alkylation of 2-alkyl-5-nitroimidazoles employing alkylthioalkyl halides not only require preparation of highly toxic vesicants related to the "mustard gases", but produce the desired alkylated imidazoles in yields inferior to those of the present process.

SUMMARY OF THE INVENTION

It has now been found that alkylation of 2-alkyl-5-nitroimidazoles with alkylthioethanols in the presence of the hydrogen halide, hydrogen chloride or hydrogen bromide and a Lewis acid selected from the group consisting of $AlCl_3$, $ZnCl_2$, $FeCl_3$, $SnCl_4$, $TiCl_4$, $SbCl_5$, and $BF_3$ in a reaction-inert solvent at temperatures of 70°–120° C. proceeds readily and permits the synthesis of imidazoles of the formula:

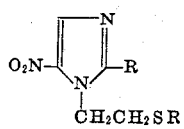

wherein R and $R_1$ are each alkyl containing from one to three carbon atoms, valuable as intermediates in the synthesis of antiprotozoal sulfones, U. S. Pat. No. 3,376,311.

Of particular interest in the process of the present invention are reactions between 2-methyl-5-nitroimidazole and alkylthioethanols, wherein said alkyl group contains from one to three carbon atoms, in the presence of hydrogen chloride and zinc chloride in a reaction-inert solvent.

DETAILED DESCRIPTION OF THE INVENTION

The herein described reaction is conveniently carried out between a 2-alkyl-5-nitroimidazole and an alkylthioethanol in a molar ratio of 1:1. It is, at times, advantageous to use a 10–20 percent excess of the imidazole and as much as a 100–150 percent excess can be employed. The molar ratio of hydrogen halide and Lewis acid to the alkylthioethanol is approximately 1:1 with slight excesses of 10–25 percent of the former reagents providing optimum results. The order of addition is not critical; in practice, the imidazole, Lewis acid and alkylthioethanol are added, either separately or combined, to a reaction-inert solvent containing the hydrogen halide. The solvent per se is not an integral part of the herein described invention, but provides a single contact phase for the starting reagents.

By reaction-inert solvent is meant a solvent which, under the conditions of the process, does not enter into appreciable reaction with either the products or the reactants. Suitable solvents for the process of this invention include di-(lower)alkylketones, N,N-di-(lower)alkyl substituted derivatives of lower alkyl carboxamides, e.g., dimethylformamide, lower alkyl nitriles, nitro(lower)alkanes and nitrobenzene. The preferred solvent of the instant process invention is methyl isobutyl ketone, said solvent being an inexpensive commercial product, having good solubilizing characteristics for the starting reagents and products of the present process invention and a boiling point within the preferred temperature range.

The reaction can be conducted over a wide temperature range; temperatures of from 70°–120° C. are, however, preferred since the reaction is completed in a reasonable period of time without extensive decomposition of the starting reagents or final products. Reaction time is not critical and depends on concentration, temperature and reactivity of the starting reagents.

The nitroimidazole products of the present invention are isolated by conventional methods known to those skilled in the art. Experimentally, the reaction mixture is cooled, diluted with water and rendered basic by the addition of an inorganic base. The desired product can then be separated from the inorganic hydroxide, arising from hydrolysis of the Lewis acid, by extraction with a suitable water-immiscible solvent. In instances wherein the original reaction solvent is water-immiscible the product in the organic phase. When zinc chloride is employed as the Lewis acid it is preferred that the reaction mixture be hydrolyzed with ammonium chloride-ammonium hydroxide, thus preventing the formation of an insoluble zinc salt. An aqueous solution of sodium hydroxide is employed for the hydrolysis of the remaining Lewis acids, sufficient base being added to dissolve the inorganic hydroxide resulting from Lewis acid.

The requisite 2-alkyl-5-nitroimidazoles employed as the starting reagents in the process are either commercial chemicals or are easily prepared by one skilled in the art, e.g., by nitration of the 2-alkylimidazoles according to the method of Cosar, et al., Ann. Inst. Pasteur, 96, 238 (1959) as reported by Butler, et al., J. Med. Chem., 10, 891 (1967). The appropriate 2-alkylimidazoles are all known compounds previously reported in the chemical literature.

Alkylthioethanols, the second starting reagent for the process of the instant invention, too, are all known in the literature and are prepared by the methods outlined by Reid, "Organic Chemistry of Bivalent Sulphur," Vol. I, Chemical Publishing Co., New York, New York, 1958, p. 378.

The remaining reagents, including the Lewis acids, solvents and hydrogen halides are commercial chemicals.

As previously mentioned, the products of the process of this invention are extremely useful in the synthesis of antiprotozoal agents. Of particular interest are the process products ethyl[2-(2-methyl-5-nitro-1-imidazolyl)ethyl]sulfide and isopropyl[2-(2-methyl-5-nitro-1-imidazolyl)ethyl]-sulfide.

The basic products of the present process invention are converted to the acid addition salts by interaction of the base with an acid either in an aqueous or non-aqueous medium. In a similar manner, treatment of the acid addition salts with an aqueous base solution, e.g., alkali metal hydroxides, alkali metal carbonates and alkali metal bicarbonates or with a metal cation which forms an insoluble precipitate with the acid anion, results in a regeneration of the free base form. Such conversions are best carried out as rapidly as possible and under temperature conditions and method dictated by the stability of said basic products. The bases thus regenerated may be reconverted to the same or a different acid addition salt.

The following examples are provided solely for the purpose of illustration and are not to be construed as limitations of this invention, many variations of which are possible without departing from the spirit or scope thereof.

EXAMPLE I

Ethyl[2-(2-methyl-5-nitro-1-imidazolyl)ethyl]sulfide

Hydrogen chloride is passed slowly into methyl isobutyl ketone (150 ml.) contained in a 500 ml. three-necked flask until 8.03 g. has been introduced. 2-Methyl-5-nitroimidazole (38.1 g.; 0.3 mole), anhydrous zinc chloride (40.8 g.; 0.3 mole) and 2-hydroxyethyl ethyl sulfide (21.1 g.; 0.2 mole) are then introduced with stirring. The stirred suspension (now at 60° C. owing to heat produced during the addition) is heated to 90° C. and kept at that temperature for 3 hours.

The reaction mixture is cooled to 20° C. and added to a well stirred solution of ammonium chloride (27.2 g.) in water (150 ml.), and the pH of the mixture thus formed adjusted to 8.0 by addition of dilute ammonium hydroxide. After stirring for half an hour, unchanged 2-methyl-5-nitroimidazole in suspension is filtered off, and the filtrate separated into an organic solvent phase and an aqueous phase. The solvent phase is briefly washed with aqueous ammonium chloride buffer solution (pH 8.0), and methyl isobutyl ketone is then distilled off from it under reduced pressure. The residue of orange-brown oil is cooled, diluted with methylene chloride (50 ml.) and left overnight. After removal by filtration of a small amount of unchanged 2-methyl-5-nitroimidazole, the solution is evaporated under reduced pressure to obtain 34.0 g. (70 percent yield) of crude ethyl[2-(2-methyl-5-nitro-1-imidazolyl)ethyl]-sulfide.

The crude material is used directly in subsequent oxidation reactions without further purification.

EXAMPLE II

Methyl[2-(2-methyl-5-nitro-1-imidazolyl)ethyl]sulfide

Hydrogen chloride is passed slowly into 150 ml. of methyl isobutyl ketone until 8.0 g. has been introduced. 2-Methyl-5-nitroimidazole (38.1 g.; 0.3 mole), anhydrous zinc chloride (34.0 g.; 0.25 mole) and 2-hydroxyethyl methyl sulfide (18.4 g.; 0.20 mole) are then introduced with stirring. The stirred suspension is heated to 90° C. and kept at this temperature for 2.5 hours. The reaction mixture is cooled to 20° C. and the two phase product added to a well stirred solution of ammonium chloride (34 g.) in water (150 ml.) and the pH of the mixture thus formed is adjusted to 8.0 by the addition of dilute ammonium hydroxide.

After stirring for half an hour, the precipitated unchanged 2-methyl-5-nitroimidazole is filtered off and the organic phase is separated from the filtrate. The solvent phase is briefly washed with aqueous ammonium chloride buffer solution (pH 8.0) and the methyl isobutyl ketone is then distilled off under reduced pressure to give 23.3 g. of crude methyl[2-(2-methyl-5-nitro-1-imidazolyl)ethyl]sulfide (58 percent yield) as a waxy solid, m.p. 42°–46° C.

The crude sulfide (10 g.) is dissolved in ethyl acetate (100 ml.) and to the clear solution is added toluene p-sulfonic acid monohydrate (10 g.) in 30 ml. industrial ethanol. An insoluble material slowly separates and precipitation is completed by placing the suspension in the refrigerator for 24 hours. Filtration and drying in vacuo at 40° C. yields 10.1 g. colorless toluene p-sulfonate (melting point 132°–5° C.).

Anal. Calcd. for $C_7H_{11}N_3O_2S \cdot C_7H_2O_3S$: C, 45.0; H, 5.1; N, 11.3; S, 17.1.

Found: C, 45.3; H, 5.2; N, 10.9, S, 17.3.

EXAMPLE III

N-Propyl[2-(2-methyl-5-nitro-1-imidazolyl)ethyl]sulfide

Hydrogen chloride is passed slowly into methyl isobutyl ketone (750 ml.) until 40 g. has been introduced. 2-Methyl-5-nitroimidazole (190 g.; 1.5 moles) anhydrous zinc chloride (170 g.; 1.25 moles) and 2-hydroxyethyl n-propyl sulfide (120 g.; 1.0 mole) are then introduced with stirring. The stirred suspension is heated to 90° C. and kept at this temperature for 2.5 hours. The reaction mixture is cooled to 20° C., the homogenous solution added to a well stirred solution of ammonium chloride (170 g.) in water (750 ml.) and the pH of the mixture thus formed is adjusted to 8.0 by the addition of dilute ammonium hydroxide solution. After stirring for 30 minutes, the precipitated 2-methyl-5-nitroimidazole is filtered off and the organic phase is separated from the filtrate. The solvent phase is briefly washed with aqueous ammonium chloride buffer solution (pH 8.0) and methyl isobutyl ketone is distilled off under reduced pressure. The residual brown oil is cooled, diluted with methylene chloride (200 ml.) and left overnight.

Unchanged 2-methyl-5-nitroimidazole ($\approx$6 g.) is filtered off and the solution evaporated under reduced pressure to obtain crude n-propyl[2-(2-methyl-5-nitro-1-imidazolyl)ethyl]sulfide (240 g.) as a brown oil.

Preparation of the toluene-p-sulfonate from 10 g. of crude product is carried out as previously described to give 8.7 g. of product, m.p. 114°–115° C.

Anal. Calcd. for $C_9H_{15}N_3SO_2 \cdot C_7H_8SO_3$: C, 47.88; H, 5.78; N, 10.47; S, 15.95.

Found: C, 48.40; H, 5.97; N, 10.14; S, 15.94.

EXAMPLE IV

Ethyl[2-(2-isopropyl-5-nitro-1-imidazolyl)ethyl]sulfide

Hydrogen chloride is passed slowly into methyl isobutyl ketone (68 ml.) until 3.6 g. has been introduced. 2-Isopropyl-5-nitroimidazole (10.2 g.; 0.066 mole), anhydrous zinc chloride (15.3 g.; 0.11 mole) and 2-hydroxyethyl ethyl sulfide (9.5 g.; 0.09 mole) are then introduced with stirring. The stirred suspension is heated to 90° C. and kept at this temperature for 2.5 hours. The reaction mixture is cooled to 20° C. and added to a well stirred solution of ammonium chloride (15.3 g.) in water (70 ml.) and the pH of the mixture thus formed is adjusted to 8.0 by the addition of dilute ammonium hydroxide solution.

After stirring for half an hour the two phases are separated. The solvent phase is briefly washed with aqueous ammonium chloride solution (pH 8.0) and the methyl isobutyl ketone is then distilled off in vacuo. The residual brown oil containing suspended matter is diluted with an approximately equal volume of ethyl acetate and filtered to recover unchanged 2-isopropyl-5-nitroimidazole (4 g.). Removal of the ethyl acetate yields an oil (8.3 g.) still containing suspended solids.

Gas-liquid chromatography analysis shows the crude product to be 58 percent of the desired ethyl[2-(2-isopropyl-5-nitroimidazolyl)ethyl]sulfide which can be oxidized without further purification to the corresponding sulfone in good yield.

EXAMPLE V

Isopropyl[2-(2-methyl-5-nitro-1-imidazolyl)ethyl]-sulfide hydrochloride

Hydrogen chloride is slowly passed into dimethylformamide (75 ml.) until 3.6 g. has been introduced. 2-Methyl-5-nitroimidazole (8.4 g.; 0.066 mole), anhydrous aluminum chloride (14.6 g.; 0.11 mole) and 2-hydroxyethyl isopropyl sulfide (12.0 g.; 0.1 mole) are then introduced with stirring. The suspension is heated to 100° C. and maintained at this temperature for 2 hours.

The reaction mixture is then cooled, diluted with water and made strongly basic by the addition of aqueous sodium hydroxide solution. The product is extracted into benzene and the organic layer separated, dried over anhydrous sodium sulfate and treated with sufficient gaseous hydrogen chloride to precipitate the hydrochloride salt of the desired product, which is collected by filtration.

The product is oxidized directly without further purification.

EXAMPLE VI

Starting with the appropriate nitroimidazole and alkylthioethanol, and repeating the procedure of Example V, the following compounds are produced employing the listed hydrogen halide and Lewis acid:

| Hydrogen halide | Lewis acid | Product |
| --- | --- | --- |
| HBr | FeCl₃ | ethyl[2-(2-methyl-5-nitro-1-imidazolyl)-ethyl]sulfide |
| HBr | BF₃ | n-propyl[2-(2-ethyl-5-nitro-1-imidazolyl)-ethyl]sulfide |
| HCl | SbCl₅ | methyl[2-(2-n-propyl-5-nitro-1-imidazolyl)-ethyl]sulfide |
| HCl | SnCl₄ | isopropyl[2-(2-isopropyl-5-nitro-1-imidazolyl)ethyl]sulfide |
| HBr | SnCl₄ | methyl[2-(2-methyl-5-nitro-1-imidazolyl)-ethyl]sulfide |
| HCl | TiCl₄ | n-propyl[2-(isopropyl-5-nitro-1-imidazolyl)ethyl]sulfide |

The above products are oxidized to the corresponding sulfone by the procedure outlined in Example VIII.

EXAMPLE VII

Methyl[2-(2-methyl-5-nitro-1-imidazolyl)ethyl]-sulfide oxalate

To 10 g. of methyl[2-(2-methyl-5-nitro-1-imidazolyl)ethyl]sulfide tosylate, prepared in Example II, dissolved in 75 ml. of water is added sufficient aqueous 6N sodium hydroxide solution to provide a pH of 8. The free base is extracted (2 × 100 ml.) with ethyl acetate and the organic phase separated and dried over anhydrous sodium sulfate. The solvent is concentrated to 50 ml., treated with 2.5 g. of oxalic acid in 15 ml. of ethanol and the resulting mixture cooled in a salt-ice bath. The resulting oxalate salt is filtered and dried in vacuo.

In a similar manner are conveniently prepared the hydrochloride, hydrobromide, nitrate, sulfate, phosphate, acetate, lactate, citrate and tartrate salts.

EXAMPLE VIII

Ethyl[2-(2-methyl-5-nitro-1-imidazolyl)ethyl]sulfone

A mixture of 530 ml. of water, ethyl[2-(2-methyl-5-nitro-1-imidazolyl)ethyl]sulfide tosylate (126 g.; 0.326 mole) and 200 ml. of chloroform is cooled to 7° C., and 136 ml. of 12.5 percent sodium hypochlorite is stirred for 15 minutes, then extracted with chloroform. The combined extracts are washed with a saturated sodium bicarbonate solution and the chloroform replaced by isopropanol. The solids are collected and dried, 39 g. (48 percent yield), m.p. 125°–126° C.

In a similar manner are prepared the following sulfones:

Isopropyl[2-(2-methyl-5-nitro-1-imidazolyl)ethyl]sulfone, m.p. 132°–133° C.;

methyl[2-(2-methyl-5-nitro-1-imidazolyl)ethyl]sulfone, m.p. 150°–151° C.;

n-propyl[2-(2-methyl-5-nitro-1-imidazolyl)ethyl]sulfone, m.p. 94°–95° C.

What is claimed is:

1. In the process for preparing an imidazole of the formula:

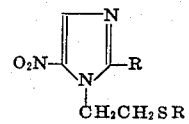

the improvement which comprises reacting a compound of the formula:

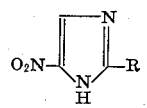

with an alcohol of the formula:

HOCH₂CH₂SR₁ wherein R and R₁ are each alkyl containing from one to three carbon atoms, in the presence of a hydrogen halide selected from the group consisting of hydrogen chloride and hydrogen bromide and a Lewis acid selected from the group consisting of AlCl₃, ZnCl₂, FeCl₃, SnCl₄, TiCl₄, SbCl₅ and Bf₃ in a reaction-inert solvent system at a temperature of from about 70°–120° C.

2. The process of claim 1 wherein the hydrogen halide is hydrogen chloride.

3. The process of claim 2 wherein the Lewis acid is ZnCl₂.

4. The process of claim 3 wherein the reaction-inert solvent is methyl isobutyl ketone and the temperature is 90° C.

5. The process of claim 4 wherein R is methyl and R₁ is ethyl.

6. The process of claim 4 wherein R is methyl and R₁ is isopropyl.

* * * * *